United States Patent [19]

Wozniak

[11] Patent Number: 4,552,823
[45] Date of Patent: Nov. 12, 1985

[54] SEPARATOR PLATE FOR LEAD-ACID BATTERY

[76] Inventor: Eugene Wozniak, 12960 S. Ashland, Blue Island, Ill. 60406

[21] Appl. No.: 628,030

[22] Filed: Jul. 5, 1984

[51] Int. Cl.$^4$ ............................................ H01M 2/18
[52] U.S. Cl. ..................................... 429/81; 429/139; 429/144
[58] Field of Search .............. 429/136, 138, 139, 142, 429/144, 81

[56] References Cited

U.S. PATENT DOCUMENTS

| | | | |
|---|---|---|---|
| 712,178 | 10/1902 | Chamberlain | 429/136 |
| 901,322 | 10/1908 | Busch | 429/136 |
| 909,572 | 1/1909 | Flanders | 429/136 |
| 1,966,237 | 7/1934 | Dinin | 429/138 |
| 2,934,565 | 4/1960 | Zahn | 429/139 |

Primary Examiner—Donald L. Walton
Attorney, Agent, or Firm—Silverman, Cass & Singer, Ltd.

[57] ABSTRACT

A separator plate for the negative electrode of a lead-acid battery comprising a molded, synthetic plastic wall or planar member of generally rectangular configuration. A pair of like separator plates are vertically oriented in the battery casing to sandwich the negative electrode therebetween including juxtaposed retention mats common in such a negative electrode assembly. The sandwich provides a clear-through channel along opposite extremities of the electrode for flow of electrolyte. The sandwich assembly is maintained by means of cooperating locking and sealing formations integral with the separator plates of the assembly. Wrapping of the positive electrode thereby is rendered unnecessary when assembling the battery and enables automated assembly of the battery using the separator plate sandwich.

23 Claims, 6 Drawing Figures

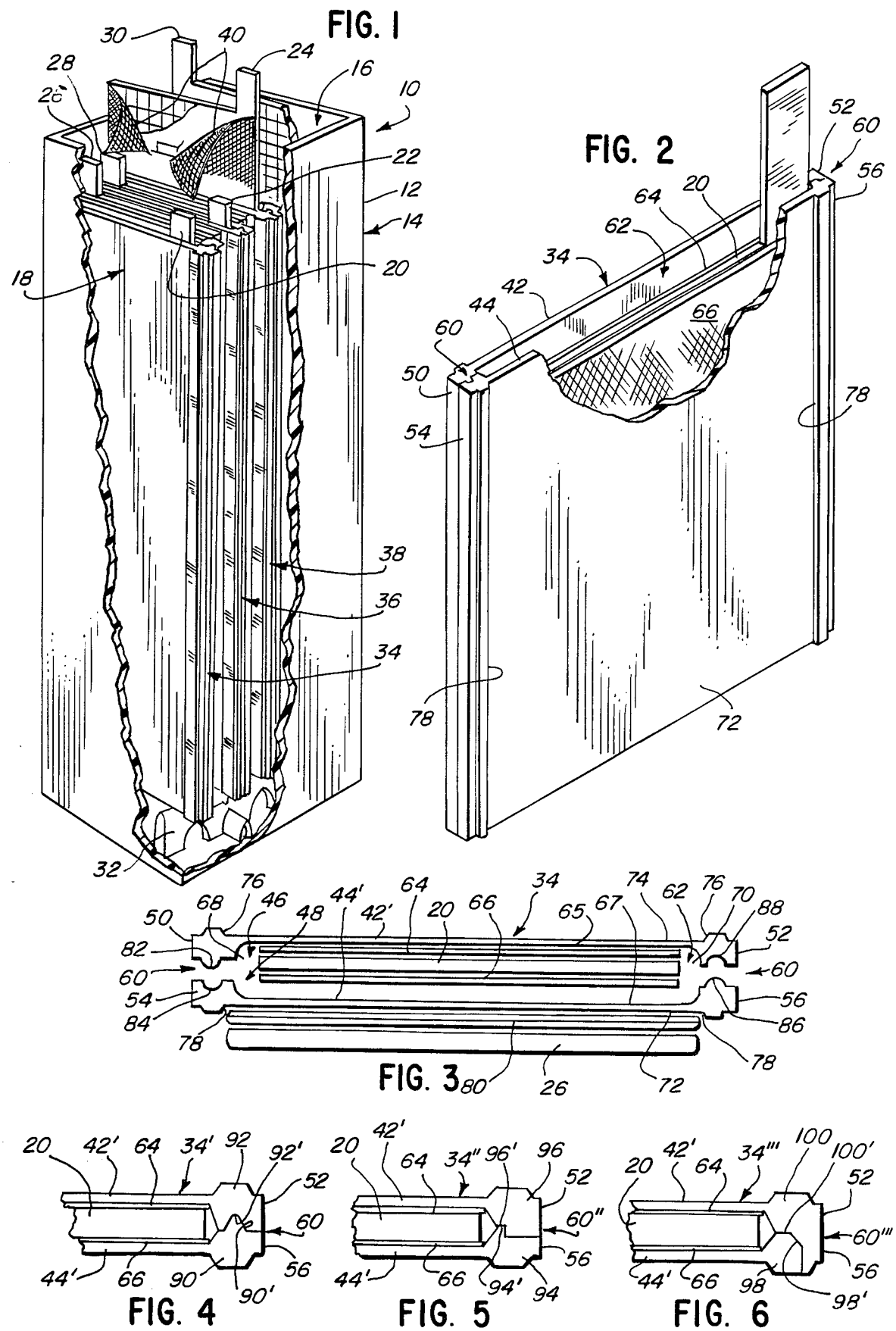

SEPARATOR PLATE FOR LEAD-ACID BATTERY

BACKGROUND OF THE INVENTION

This invention relates generally to lead-acid batteries and more particularly, relates to a novel separator plate for use in such a battery to form a separator sandwich with a pair of like separator plates having the negative electrode of the battery sealed between the plates and including flow-through channels or conduits for electrolyte.

Lead-acid batteries comprise a stack of electrode plates, juxtaposed oxide retention mats and separator plates submerged in a liquid acid bath contained in a case. The separator plates are interposed between the electrodes to prevent electrical shorting directly across the narrow space between the stacked electrodes. Glass fiber retention mats sandwiched between the separator plates and electrodes retain much of the oxide material shed by the electrodes during the electrical energy production and slow its suspended migration through the acid bath liquid.

A problem in such batteries is the "treeing" or electrical short circuit paths that can occur around the sides, top and bottoms of the separator plates at the edges of the electrodes and be facilitated by the oxide material suspended in the liquid acid bath. It is desirable to reduce or alleviate this "treeing" effect, especially at the vertical sides of the electrodes, and in a manner that avoids increasing the thickness of the battery stack.

In such lead acid batteries, normally the positive electrode is thicker than the negative electrode. To stack the electrodes alternately and suitably separated, provision also must be made for proper and adequate circulation of electrolyte. The prior art dealt with these requirements by separate and suitable wrapping or encapsulating or coating the positive electrode because of the shedding problem. Since the positive electrode was approximately 0.250 inches thick as compared to the thickness of the negative electrode of approximately 0.125 to 0.155 inches, the successful treatment of the positive electrode did not contribute to successfully increasing the number of electrodes used in a storage battery of the same given size with attendant advantages.

Reference can be had to U.S. letters patent which dealt with this problem in relation to the positive electrode, as follows: U.S. Pat. Nos. 852,569, Lyndon; 1,247,123, Luthy; 1,526,889, West; 2,047,179, Martis; 2,256,105, Shank; 2,490,630, Jardine; 3,201,280, Yumoto.

My invention provides a separator plate for pocketing the negative electrode with attendant prevention of short circuiting between electrodes, thereby allowing more electrodes per cells, lower electrical resistance, increased voltages generated and greater electrical capacities than heretofore achieved in lead-acid batteries with which the invention is concerned. It will no longer be necessary to wrap the positive electrode when assembling the battery in order to avoid short circuiting between electrodes. The invention also encourages employing automated assembly techniques for such a storage battery.

SUMMARY OF THE INVENTION

A separator plate for the negative electrode is provided molded of a suitably strong synthetic plastic, such as polyvinylchloride. A pair of like separator plates is assembled as a sandwich assembly having the negative electrode between the plate and including conventional glass fiber retention mats. Each plate has one-half of a cooperating matingly engage locking and sealing means integrally formed along a pair of opposing marginal edges of the plate. When the separator plate sandwich assemly is formed, the pair of plates are 180 degrees out of phase and parallel one with the other so that the plates have said maiting halves of said means which can be locked together and seal the plates along said marginal edges.

The locking and sealing means are integrally formed with the separator plate and when so engaged together, are spaced from the negative electrode to provide a flow-through conduit for electrolyte at said opposing marginal edges extending from the top and bottom marginal edges of the sandwich assembly. Thus, the assembled separator plates provide a pocket formation for the negative electrode and flow-through channels for electrolyte.

Further, each molded plate member can be formed with upstanding or protruding abutments along the surface thereof opposite said means for positioning and locating a positive electrode.

It will be appreciated that the separator plate of the invention molded as an integral wall member is feasible because the negative electrode sandwiched between a pair of the separator plates is so much thinner than a positive electrode. This enables the locking and sealing means to be suitably dimensioned and still retaining sufficient structural strength for achieving the successful sandwich assembly.

Multiple embodiments of the separator plate of the invention are described and illustrated featuring different locking and sealing means.

BRIEF DESCRIPTION OF THE DRAWING

FIG. 1 is a perspective view of a lead-acid battery including the invention in which the case is partially in section;

FIG. 2 is a perspective view of a separator plate of the invention encompassing a negative electrode and juxtaposed retention mats;

FIG. 3 is a top edge view of the separator plate of the invention positioned relative to a negative and a positive electrode and justaposed retention mats;

FIG. 4 is a partial top edge view of the separator plate of the invention illustrating an alternative embodiment of the locking means;

FIG. 5 is a partial top edge view of the separator plate of the invention illustrating an alternative embodiment of the locking means; and FIG. 6 is a partial top edge view of the separator plate of the invention illustrating an alternative embodiment of the locking means.

DESCRIPTION OF THE PREFERRED EMBODIMENT

Referring to the drawing, a lead-acid battery 10 comprises a jar 12 of a case 14, the cover of which is not shown. Also, not shown is the liquid acid both in the well 16 and the terminal posts joining together the positive and negative electrodes. These are well known. Seated within the well 16 of jar 12 is a stack 18 of electrodes, oxide material retainer mats, and separator plates. The negative electrodes, such as 20, 22 and 24, and positive electrodes, such as 26, 28 and 30, are arranged interleaved of one another throughout the stack 18. The battery 10 further includes a bridge 32 in the bottom of the well 16 of jar 12 upon which the stack rests and which provides free space for accummulation of oxide material sediment. Separator plates sandwich assemblies 34, 36 and 38, respectively, encompass negative electrodes 20, 22 and 24 and their juxtaposed retainer or retention mats, one of which mats 40 is shown slit and peeled from negative electrode 24 for viewing only.

Separator plate sandwich assembly 34, which is identical to assemblies 36 and 38 and other like separator plate assemblies, is comprised of a pair of like thin, planar, rectangular separator plates 42 and 44 molded of an acid resistant material , such as a polyvinylchloride. Plates 42 and 44 are identical in construction and configuration. The medial portions or the walls 42' and 44' thereof are reduced in thickness to present recesses, respectively, 46 and 48. The walls 42' and 44' are joined together along vertically extending lateral margins portions 50 and 52 and 54 and 56, respectively, by cooperating locking means 60. Thus joined, parallel, spaced walls 42' and 44' present a pocket 62 therebetween extending the height of the sandwich assembly.

Referring to FIG. 3, negative electrode 20 and juxtaposed retention mats 64 and 66 are frictionally engaged in pocket 62 sandwiched between plate walls 42' and 44'. The thickness of pocket 62 or the distance between the interior surfaces 65 and 67 of walls 42' and 44' is dimensioned so that the retention mats 64 and 66 are slightly compressed between the negative electrode 20 and walls 42' and 44' in the assembled stack. This retains vertically the separator plate assembly 34 is relative to the electrode 20 against the pull of gravity. The width of the electrode 30 and mats 64 and 66 is less than the dimension of pocket 62 between the locking means 60 to obtain vertically extending acid flow channels 68 and 70. Channels 68 and 70 provide free flow of the liquid acid along the side edge of the electrode 20 in a vertical flow pattern. This reduces electrical resistance of the battery structure.

Separator plate assembly 34 may include two pairs of protruding or upstanding abutments or shoulders on the exterior surfaces 72 and 74 of plate walls 42' and 44', respectively. One pair of shoulders 76 is located at the margins 50 and 52 of wall 42' and the other pair of shoulders 78 is located at the margins 54 and 56 of wall 44'. The shoulders 76 and 78 form locating or centering formations for the juxtaposed retention mat 80 and positive electrode 26. The mat 80 is a retention separator comprised of a glass mat and an insulating separator which is available commercially. The shoulders 76 and 78 aid in centering the positive electrodes 26 and their juxtaposed retention mats, such as 80, during assembly of the stack 18. In this embodiment, the shoulders 76 and 78 are the beveled side surfaces of simple projections from the exterior surfaces of walls 42' and 44'. Other geometrical shapes can be used to obtain the same function. Separate wrapping of the positive electrode, as done in the prior art battery, is eliminated because of the sealing function of the locking mean 60.

Locking means 60 performs the function of sealing the lateral margins 50, 52, 54 and 56 from "treeing". Several different structures are shown that achieve this function. In FIGS. 2 and 3, locking means 60 comprises pin and socket or tongue and groove formations 82 and 84 on margins 50 and 54, respectively, and corresponding raised and recessed formations 86 and 88 on margins 56 and 52, respectively. The raised and recessed formation engage with their registered mate under the compressive force applied to the stack 18 and seal the lateral margins of the separator plates in assembly 34.

Walls 42' and 44' are cut from elongate molded or extrusion members of constant geometrical shape. One lateral margin is formed with a raised structure such as 82 while the opposed lateral margin is formed with a recessed structure such as 88. By cutting the molding or extrusion to desired lengths to obtain walls 42' and 44', and rotating the walls 180 degrees relative to one another, in their planes, the desired mating structures are properly aligned facing each other. Thus, the separator plate assembly 34 is formed from a pair of like separator plate moldings or extrusions. This feature is achieved in all of the embodiments illustrated. Although the structures of locking means 60 are only shown in true cross-section, they extend vertically along the entire length of the lateral margin of a separator plate 42 or 44 in constant cross-sectional configuration.

In FIGS. 4, 5 and 6, the separator plate sandwich assembly 34 is shown compressed to encompass the negative electrode 20 and its retention mats 64 and 77 with the locking means thereof fully engaged. Since the locking means of each embodiment is symmetrical at opposed lateral margins of the individual separator plates 42 or 44, a description of the lock parts at one lateral margin will suffice for understanding the fully engaged structure.

In FIG. 4, locking means 60' comprises a protuberant formation 90 on margin 56 and a recessed formation 92 on margin 52. Formations 90 and 92 have a "V"-shaped cross-section portions 90' and 92' in the thickened bodies thereof which provide the required strength for sealing the sandwich assembly 34'. Parts of the separator plates 42 and 44 which are identical in this embodiment are identified by identical numerals.

In FIG. 5, locking means 60" comprises a raised structure 94 on margin 56 and a recessed structure 96 on margin 52 for sealing assembly 34". Structures 94 and 96 have the geometrical shape of double right angles and provide the matingly engaged cooperating parts 94' and 96'.

In FIG. 6, locking means 60'" comprises a configured structure 98 on margin 56 and a configured structure 100 on margin 52 for sealing assembly 34'". Structures 98 and 100 have the geometrical shape of a beveled right angle or a pair of cooperating obtuse or oblique angles which can be matingly engaged and locked together as seen at 98' and 100'.

In all of these embodiments, the lateral marginal portions of the opposed walls are sealed against the "treeing" effect formerly resulting in such batteries.

Sandwiching the negative electrode 20 and mats 64 and 66 in separator plate assembly 34 results in less material usage in stack 18 than if the positive electrode and its mats are encompassed with a similar separator plate. Positive electrodes are thicker than negative electrodes and providing the disclosed locking means in separator plates 34' for the positive electrodes would require more material and add more weight to the battery. Also, the size and configuration of the cooperating locking and sealing means, such as 60, would have to be enlarged so as to accommodate the positive electrode in a pocket formation therebetween. This would not be feasible in view of strength requirements for the molded plastic material being used for the separator plate.

In practice of the invention, important practical advantages, in a lead-acid battery have been realized. These include important economies in manufacture and assembly of the battery, lower electrical resistance, sustaining of higher battery voltages and thinner assemblies so that more plates per cell could be realized. Also, greater surface area of the electrode is exposed to electrolyte thereby providing greater capacity in the same cubical space of the jar or for the entire battery. It also is contemplated that by eliminating separate wrapping of the positive electrode, assembly of my battery using the separator plate sandwich assemblies can be automated.

Modifications and variations of the present invention are possible in light of the above teachings. It is, therefore, to be understood that within the scope of the appended claims, the invention can be practiced otherwise than as specifically described.

I claim:

1. In a lead acid storage battery having a casing for storing electrolyte therein and a stack of planar negative and positive electrodes in alternating assembly upstanding in the casing, an oxide material retention mat juxtaposed opposite surfaces of each electrode, and a separator plate sandwich assembly for each said negative electrode, the improvement comprising:

A. The separator plate sandwich assembly comprised of a pair of like opposing, planar wall segments spaced one from the other by a pair of protrusions along their proximate lateral marginal edges, and joined along their proximate lateral marginal edges to form a pocket formation opening to the top and bottom edges thereof with said opposed walls sandwiching the negative electrode and juxtaposed retention mats therebetween in the pocket formation;

B. cooperatively engaged locking means integrally formed with said protrusions to lock together and seal the lateral margins of the separator plate assembly from electrical paths therethrough effecting short circuiting between said positive and negative electrodes, said opposing planar wall segments being spaced by a distance sufficient to permit frictional engagement of the negative electrode and juxtaposed retention mats, and having a length sufficiently greater than the length of the negative plate to create vertically extending flow channels and permit flow-through of electrolyte between the negative electrode and the locked lateral margins; and C. a pair of upstanding abutments along the lateral marginal edges of said wall segments facing diametrically opposite to said protrusions, for locating and positioning a positive plate and juxtaposed retention mat therebetween.

2. The battery of claim 1 in which said assembly is comprised of a pair of like molded separator plate members each providing a wall segment and one half of the cooperating locking means.

3. The battery of claim 1 in which said locking means comprise tongue and groove mating parts.

4. The battery of claim 1 in which said locking means include a raised formation on the interior surface of one lateral margin of a wall and a recessed formation on the interior surface of the opposed lateral margin of said wall.

5. The battery of claim 4 in which said walls are formed from an elongate member of constant geometrical shape, the walls being assembled or rotated in their planes 180 degrees relative to one another so that the raised formation of one wall is in registration with the recessed formation of the other wall.

6. The battery of claim 1 in which said locking means include a raised formation on the interior surface of a lateral margin of one of the walls and a registered, recessed formation on the facing interior surface of the lateral margin of the other wall, so that when the assembly is compressed in the case, the raised and recessed formations are engaged to seal against electrical paths through the locking means.

7. The battery of claim 6 in which said raised and recessed formations extend along the length of the lateral margins in a constant cross-sectional configuration.

8. The battery of claim 7 in which said configuration is semi-circular.

9. The battery of claim 7 in which said configuration is "V"-shaped.

10. The battery of claim 7 in which said configuration is of cooperating oblique angles.

11. A separator plate for the negative electrode of a lead acid storage battery comprising:

A. a molded integral plate member of acid resistant synthetic material having a medial planar wall segment of generally rectangular configuration;

B. said wall segment having opposite lateral marginal edges and upper and lower marginal edges;

C. said lateral marginal edges each having an outward protrusion relative to one face of the wall segment, said protrusion having one half of matingly engagable locking means extending outwardly relative to said one face of the wall segment; and D. a pair of upstanding abutments along the lateral marginal edges of said wall segment, each abutment facing diametrically opposite to one said protrusion, wherein said plate may be mated with another separator plate along said lateral marginal edges of said locking means, to form a pocket open at the upper and lower marginal edges, said pocket for frictionally engaging a negative plate and juxtaposed retention mats of a storage battery and providing vertical flow channels for battery electrolyte between the plate and the locked marginal edges, and wherein said abutments are for locating and positioning a positive plate and juxtaposed retention mat of a storage battery.

12. The separator plate of claim 11 in which said locking means comprises a tongue formation extending the length of one lateral marginal edge, and a socket formation extending the length of the other lateral marginal edge.

13. A separator plate assembly for use in a lead acid battery, the battery having a case, a quantity of liquid acid in the case, and a stack of interleaved, planar, positive and negative electrodes in the case, each electrode being sandwiched between a pair of juxtaposed oxide material retention mats, said battery having a separator plate between adjacent mats, the separator plate assembly comprising:

two opposed, planar walls spaced from one another by protrusions along their lateral margins, and joined along their lateral margins by locking means to present a pocket formation open to the top and bottom, the locking means including mating structures on said protrusions to seal the lateral margins of the separator plate from electrical paths therethrough, said planar walls including a pair of upstanding abutments on their lateral marginal edges facing diametrically opposite to said protrusions, said abutments for locating and positioning one said positive plate and juxtaposed retention mat therebetween, wherein said pocket formation is for frictionally engaging a negative electrode of said battery and juxtaposed retention mats, and providing vertical flow channels between said locked lateral margins and the engaged negative electrode.

14. The assembly of claim 13 in which said locking means include a raised structure on the interior surface of one lateral margin of a wall and a recessed structure on the interior surface of the opposed lateral margin of said wall.

15. The assembly of claim 14 in which said walls are formed from an elongate member of constant geometrical shape, the walls being assembled and rotated in their planes 180 degrees relative to one another so that the raised structure of one wall is in registration with the recessed structure of the other wall.

16. The assembly of claim 13 in which said locking means include a raised structure on the interior surface of a lateral margin of one of the walls and a registered, recessed structure on the facing interior surface of the lateral margin of the other wall, so that the raised and recessed structures can engage with one another to seal against electrical paths through the lock means.

17. The assembly of claim 16 in which said raised and recessed structures extend along the length of the lateral margins in a constant cross-sectional configuration.

18. The assembly of claim 17 in which said configuration is semi-circular.

19. The assembly of claim 17 in which said configuration is "V"-shaped.

20. The assembly of claim 17 in which said configuration is of double right angles.

21. The assembly of claim 17 in which said configuration is of cooperating oblique angles.

22. A lead acid battery comprising:
A. An outer casing containing electrolyte;
B. alternately stacked positive and negative electrodes assembled vertically in the casing including protuberant electrical contacts and electrical connector bar for the contacts;
C. oxide retention mats juxtaposed opposite surfaces of the electrodes;
D. a pair of like molded separator plates for sandwiching each of the negative electrodes and associated retention mats therebetween in a friction fit;
E. said separator plates having a pair of protrusions along their lateral marginal edges, said protrusions having integral locking and sealing means cooperatively engaged along a pair of opposite marginal edges thereof and spaced linearly from the negative electrode to provide vertical channels between the engaged marginal edges and the negative electrode for battery electrolyte passage in contact with the negative electrode; and
F. a pair of upstanding abutments along the lateral marginal edges of the separator plates facing diametrically opposite to said protrusions, for locating and positioning a positive plate and juxtaposed retention mat therebetween.

23. The battery of claim 22 in which the positive electrodes are not wrapped with an insulating material.

* * * * *